US008799421B1

(12) United States Patent
Hutchison et al.

(10) Patent No.: US 8,799,421 B1
(45) Date of Patent: Aug. 5, 2014

(54) DYNAMIC APPLICATION CONFIGURATION (75) Inventors: Allen Hutchison, San Jose, CA (US);
Bassem Elkarablieh, San Jose, CA (US)

(73) Assignee: Google Inc., Mountain View, CA (US)

( * ) Notice: Subject to any disclaimer, the term of this patent is extended or adjusted under 35 U.S.C. 154(b) by 799 days.

(21) Appl. No.: 12/960,692

(22) Filed: Dec. 6, 2010

(51) Int. Cl.
*G06F 15/16* (2006.01)
*G06F 15/173* (2006.01)

(52) U.S. Cl.
USPC ............ 709/220; 709/226; 709/227; 709/230

(58) Field of Classification Search
USPC ............ 709/220–226, 238; 707/200; 717/103
See application file for complete search history.

(56) References Cited

U.S. PATENT DOCUMENTS

| | | | |
|---|---|---|---|
| 6,615,166 B1 * | 9/2003 | Guheen et al. ................... 703/27 |
| 6,820,157 B1 * | 11/2004 | Eide et al. ...................... 710/303 |
| 7,174,534 B2 * | 2/2007 | Chong et al. .................. 717/105 |
| 8,560,690 B2 * | 10/2013 | Chandrasekaran et al. .. 709/226 |
| 2007/0168394 A1 * | 7/2007 | Vivekanand ................... 707/200 |
| 2007/0198982 A1 * | 8/2007 | Bolan et al. .................... 718/104 |
| 2010/0057832 A1 * | 3/2010 | Tsun et al. ..................... 709/203 |
| 2010/0262695 A1 * | 10/2010 | Mays et al. .................... 709/226 |
| 2011/0119381 A1 * | 5/2011 | Glover et al. ................. 709/226 |
| 2012/0166610 A1 * | 6/2012 | Doh et al. ...................... 709/223 |

* cited by examiner

*Primary Examiner* — Asad Nawaz
*Assistant Examiner* — Berhanu Belete
(74) *Attorney, Agent, or Firm* — Fish & Richardson P.C.

(57) ABSTRACT

A computer-implemented method includes retrieving, from a data repository, one or more resource requirements associated with a plurality of services; receiving computing resource information associated with a group of available computing devices; determining, at least partly based on the one or more resource requirements for the plurality of services and the computing resource information for the group of available computing devices, an allocation of the plurality of services across the group of available computing devices; detecting an occurrence of an event in a computing device associated with the group of available computing devices; removing, based on detecting, the computing device from the group of available computing devices to generate an updated group of available computing devices; and re-allocating the plurality of services across the updated group of available computing devices.

20 Claims, 5 Drawing Sheets

DYNAMIC APPLICATION CONFIGURATION

TECHNICAL FIELD

This patent application relates generally to determining how applications should be allocated across a number of computing resources.

BACKGROUND

A business generally employs applications to handle its business needs. Generally, applications refer to computer programs designed for a specific task or use. For example, the business may employ a human resources ("HR") application that is configured to track employee HR information, including, e.g., salary information, title information, contact information, and so forth. The business may also employ a benefits application that is configured to track employee benefit information, including, e.g., retirement information, vacation information, health insurance information, and so forth.

A business may access its applications in numerous ways. In an example, a business may host servers, with each server being pre-loaded with a particular application, for example, an HR application. In another example, a business may use third-party servers to host the business's applications. In this example, the business may access its applications from the third-party servers through a user interface ("UI").

SUMMARY

In one aspect of the present disclosure, a computer-implemented method includes retrieving, from a data repository, one or more resource requirements associated with a plurality of services; receiving computing resource information associated with a group of available computing devices; determining, at least partly based on the one or more resource requirements for the plurality of services and the computing resource information for the group of available computing devices, an allocation of the plurality of services across the group of available computing devices; detecting an occurrence of an event in a computing device associated with the group of available computing devices; removing, based on detecting, the computing device from the group of available computing devices to generate an updated group of available computing devices; and re-allocating the plurality of services across the updated group of available computing devices.

Implementations of the disclosure may include one or more of the following features. In some implementations, the computing device includes a first computing device, and the method further includes: receiving, from a second computing device, a request for an identity of a third computing device that is hosting a particular service; and sending, to the second computing device, information indicative of the identity of the third computing device that is hosting the particular service. In other implementations, the method further includes: receiving, from a second computing device in the group of available computing devices, a request for configuration data; determining a service that is allocated to the second computing device; and sending, to the second computing device, configuration data associated with the service that is allocated to the second computing device.

In still other implementations, the configuration data includes first configuration data, the service includes a first service, and the method further includes: determining, based on the re-allocating, a second service allocated to the second computing device; and sending, to the second computing device, second configuration data associated with the second service allocated to the second computing device. In some implementations, the event includes detection of the computing device being overloaded by data requests. The method may further include receiving information indicative of a subscription to at least one of the services in the plurality of services. The method may additionally include generating a mapping of an assignment of the plurality of services to the group of available computing devices.

In another aspect of the disclosure, one or more machine-readable media are configured to store instructions that are executable by one or more processing devices to perform functions including retrieving, from a data repository, one or more resource requirements associated with a plurality of services; receiving computing resource information associated with a group of available computing devices; determining, at least partly based on the one or more resource requirements for the plurality of services and the computing resource information for the group of available computing devices, an allocation of the plurality of services across the group of available computing devices; detecting an occurrence of an event in a computing device associated with the group of available computing devices; removing, based on detecting, the computing device from the group of available computing devices to generate an updated group of available computing devices; and re-allocating the plurality of services across the updated group of available computing devices.

In still another aspect of the disclosure, an electronic system for includes one or more processing devices; and one or more machine-readable media configured to store instructions that are executable by the one or more processing devices to perform functions including: retrieving, from a data repository, one or more resource requirements associated with a plurality of services; receiving computing resource information associated with a group of available computing devices; determining, at least partly based on the one or more resource requirements for the plurality of services and the computing resource information for the group of available computing devices, an allocation of the plurality of services across the group of available computing devices; detecting an occurrence of an event in a computing device associated with the group of available computing devices; removing, based on detecting, the computing device from the group of available computing devices to generate an updated group of available computing devices; and re-allocating the plurality of services across the updated group of available computing devices.

In yet another aspect of the disclosure, an electronic system includes a module for retrieving, from a data repository, one or more resource requirements associated with a plurality of services; means for receiving computing resource information associated with a group of available computing devices; means for determining, at least partly based on the one or more resource requirements for the plurality of services and the computing resource information for the group of available computing devices, an allocation of the plurality of services across the group of available computing devices; means for detecting an occurrence of an event in a computing device associated with the group of available computing devices; means for removing, based on detecting, the computing device from the group of available computing devices to generate an updated group of available computing devices; and means for re-allocating the plurality of services across the updated group of available computing devices.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system that determines how a business's applications should be allocated across the business's computing resources, including, e.g., computing devices, servers, processing devices, machines, computer systems, any arrangement, cluster and/or combination thereof, and so forth. That is, rather than pre-loading a business's computing resources with applications that are used by the business, the system stores information indicative of the applications that are used by the business. Based on the business's computing resources, the system allocates the business's applications across the business's computing resources by determining which particular computing resources should implement particular applications. The system informs a computing resource of its identity by notifying the computing resource of a particular application to be implemented by the computing resource. The system performs allocation of the applications in a manner that may enhance performance of the business's computing resources.

To access an application stored by the system, a business subscribes to the application. A business that subscribes to an application may be referred to as a tenant, because the business is renting space from the system to store the business's application. When a tenant subscribes to an application, the system generates a vertical for the business. Generally, a vertical refers to an instance of an application that is associated with a particular tenant.

In an example, a tenant subscribes to a service and/or an application, including, e.g., an HR application, a benefits application, an employee leave application, a software development application, a document tracking application, and so forth. In a particular example of an HR application, when subscribing to the HR application, the tenant sends the system the tenant's employee HR information, including, e.g., information specifying employee salary information, employee title information, and employee contact information. The system generates a vertical of the HR application for the tenant. The system also generates configuration information specifying how the tenant's computing resources should be configured to run the vertical. The configuration information may also include the tenant's employee HR information, which may be used by a vertical of the HR application to implement various processes associated with the HR application.

Figure 1:
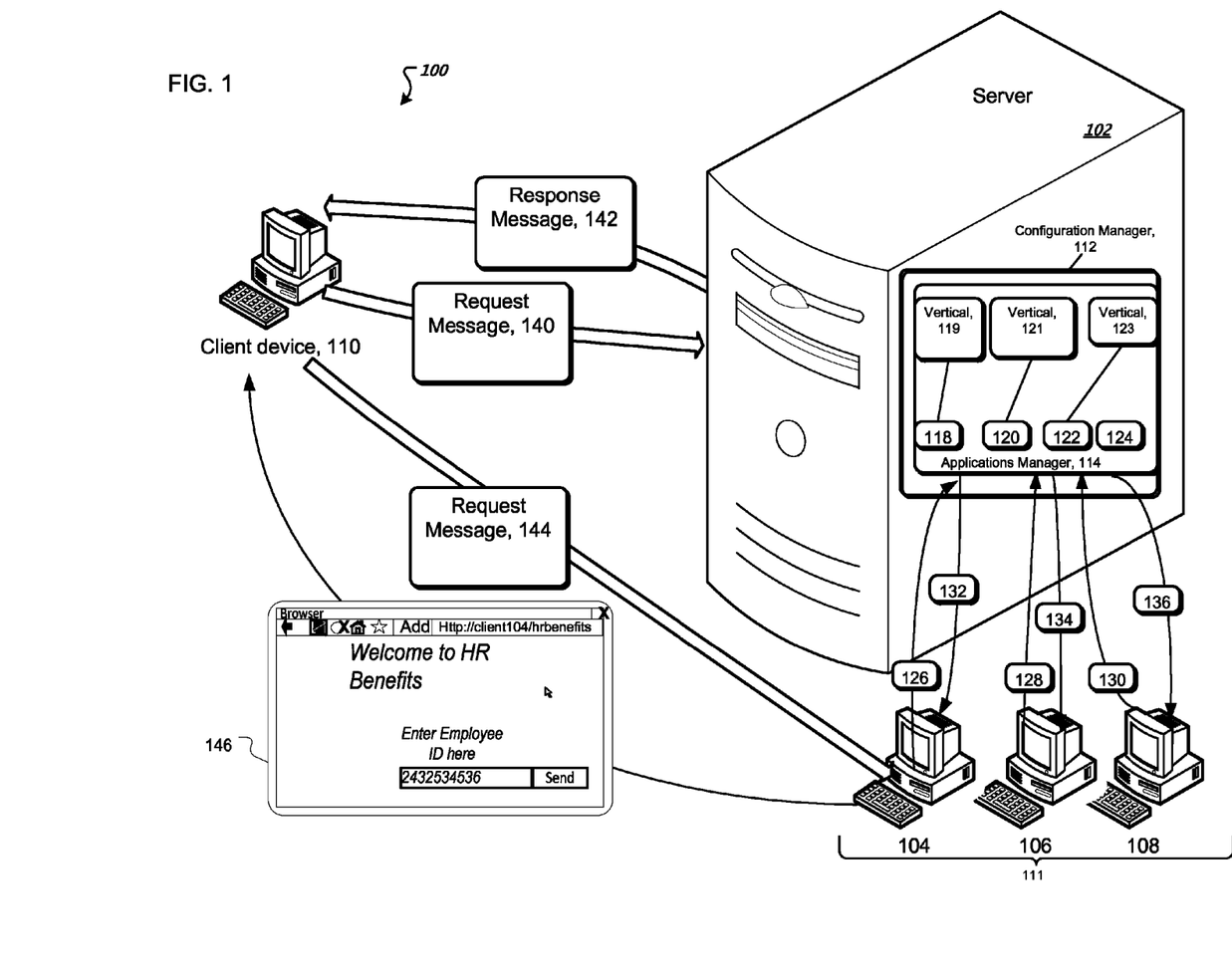
FIG. 1 is a conceptual diagram of a system for determining an allocation of verticals across a tenant's resources.

FIG. 1 is a conceptual diagram of system 100 for determining an allocation of verticals across computing resources of tenant 111. In the example of FIG. 1, the computing resources include client devices 104, 106, 108. System 100 also include server 102. Server 102 includes configuration manager 112, which is configured to determine an allocation of verticals across client devices 104, 106, 108.

Configuration manager 112 includes applications manager 114. Applications manager 114 generates verticals for a tenant, based on applications which are subscribed to by the tenant. In the example of FIG. 1, applications manager 114 includes information indicative of four applications offered for subscription by server 102, namely applications, 118, 120, 122, 124.

To begin the process of determining an allocation of verticals across client devices 104, 106, 108, tenant 111 sends server 102 an initialization message (not shown), which includes initialization information. The initialization information may include subscription information, computing resource information, and tenant information, as described in further detail below.

In the example of FIG. 1, the subscription information specifies that tenant 111 subscribes to applications 118, 120, 122. Based on the subscription information, applications manager 114 generates verticals 119, 121, 123. Vertical 119 includes an instance of application 118 for tenant 111. Vertical 121 includes an instance of application 120 for tenant 111. Vertical 123 includes an instance of application 122 for tenant 111.

In another example, an application is associated with multiple verticals. In a variation of FIG. 1, verticals 119, 121, 123 may each include an instance of application 118. In this example, application 118 may include numerous modules, which when executed at a same time are used together to implement application 118. In particular, vertical 119 may include a particular module associated with application 118. Vertical 121 may include another module associated with application 118, and so forth. As described here, configuration manager 112 determines which modules of application 118 to implement (as verticals) on client devices, for example, based on the computing resources of the various client devices. In examples described herein, a single application may also be implemented across numerous verticals.

The initialization message may also include tenant information, including information appropriate to the applications to which the tenant is subscribing. For example, tenant information may include employee HR information, employee benefit information, and so forth.

The initialization message also includes computing resource information. Generally, computing resource information includes specifying an amount of computing resources associated with a tenant. In an example, computing resource information may include information specifying that tenant 111 is associated with client devices 104, 106, 108. Computing resource information may also include information specifying processing speeds, bandwidth capabilities and/or an amount of memory associated with client devices 104, 106, 108.

Based on the computing resource information, configuration manager 112 executes a sharding algorithm to determine an allocation of verticals 119, 121, 123 across client devices 104, 106, 108. As described in further detail below, a sharding algorithm may include a set of instructions that determine an allocation of applications across computing resources in a manner that efficiently uses the computing resources. In the example of FIG. 1, configuration manager 112 determines that an allocation of verticals 119, 121, 123 across client devices 104, 106, 108 includes each of verticals 119, 121, 123 being implemented on a different client device. Specifically, configuration manager 112 allocates vertical 119 to client device 104, vertical 121 to client device 106, and vertical 123 to client device 108.

In an example, configuration manager 112 is configured to shard services across several client devices. In this example, tenant 111 includes eight client devices (not shown). That is, tenant 111 has allocated a number of resources (e.g., eight client devices) to run the service. Configuration manager 112 generates an optimal mapping of the services across the eight client devices, for example, for optimal performance of the services. If the allocated number of resources changes over time, configuration manager 112 is configured to dynamically re-shard the application over the new set of resources, as described in further detail herein.

As tenant 111 powers on (or otherwise wakes-up) client devices 104, 106, 108, client devices 104, 106, 108 may not be configured to implement a vertical. Accordingly, client devices 104, 106, 108 need to be informed of an identity, including e.g., a vertical to be implemented by the client device. As described in further detail below, client devices 104, 106, 108 are informed of an identity by sending server 102 an identity request message. Generally, an identity refers to a set of applications and/or verticals which are implemented by a client device.

Client devices 104, 106, 108 learn of their respective identities by sending server 102 identity request messages 126, 128, 130. In an example, identity request message 126 may include a unique identifier, which specifies that identity request message 126 is associated with client device 104.

Configuration manager 112 also generates identity response messages 132, 134, 136, which include configuration information for client devices 104, 106, 108 to implement verticals 119, 121, 123. In the example of FIG. 1, identity response message 132 includes configuration information for client device 104 to implement vertical 119. In this example, vertical 119 corresponds to an instance of an HR application for tenant 111. Configuration information may also include tenant information appropriate for the HR application, namely employee HR information for tenant 111.

In an example, configuration manager 112 receives identity request message 126. Based on the unique identifier included in identity request message 126, configuration manager 112 determines that client device 104 is requesting an identity. Accordingly, configuration manager 112 determines that vertical 119 has been allocated to client device 104. Configuration manager 112 sends client device 104 identity response message 132. As described above, identity response message 132 includes configuration information associated with vertical 119. Based on the configuration information, client device 104 implements vertical 119 by executing application 118 using the appropriate tenant information.

Through system 100, a client device may also learn an address of another client device that is hosting a particular vertical. For example, because an identity of client devices may change, for example when verticals are re-sharded, a client device that wants to access a particular vertical needs a way to learn an address of the client device that is hosting the particular vertical.

In the example of FIG. 1, system 100 also includes client device 110. Client device 110 represents a client device that is seeking an address of a computing resource that is hosting a particular vertical. Specifically, client device 110 sends server 102 request message 140. Request message 140 includes a request for the address of the computing resource that is implementing vertical 119. Server 102 receives request message 140 and passes request message 140 to configuration manager 112. Configuration manger 112 determines that client device 104 is implementing vertical 119. Accordingly, server 102 generates response message 142. Response message 142 includes information specifying the address at which vertical 119 may be accessed from client device 104.

In an example, vertical 119 is accessible from client device 104 at the following address: http://www.clientdevice104/HRvertical. Accordingly, response message 142 includes the following address: http://www.clientdevice104/HRvertical.

Client device 110 uses the address to access vertical 119 from client device 104. Specifically, in the example of FIG. 1, client device 110 sends request message 144 to client device 104. Request message 144 includes a request for a UI associated with vertical 119. In response, client device 104 sends client device UI 146. UI 146 includes a visual representation of vertical 119, namely the HR application that is used by tenant 111.

Figure 2:
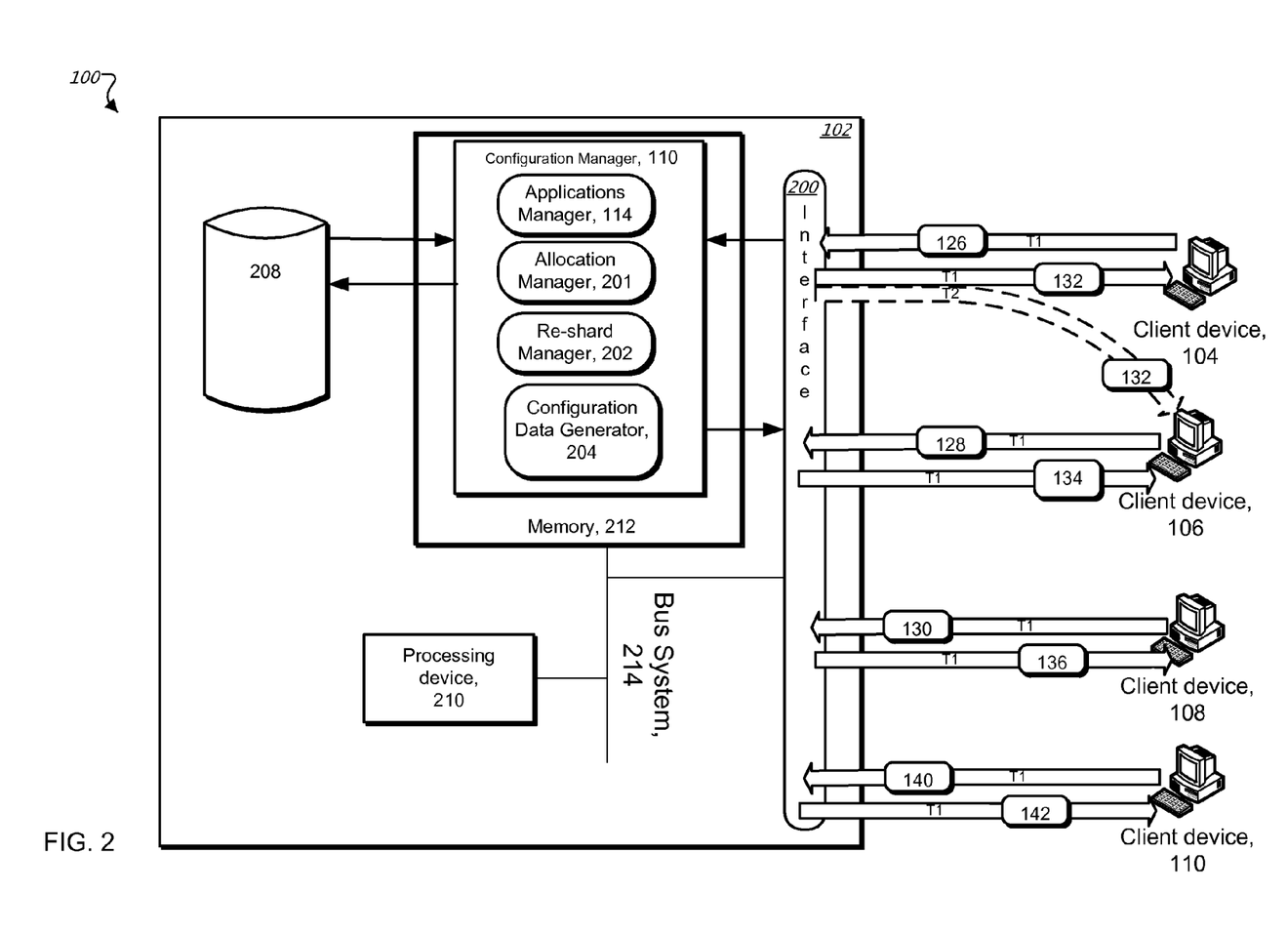
FIG. 2 is a block diagram of components of the system for determining the allocation of verticals across the tenant's resources.

FIG. 2 is a block diagram of components of system 100 for determining an allocation of verticals across a tenant's computing resources. In the example of FIG. 2, tenant 111, applications 118, 120, 122, 124, response message 142, request message 140 and verticals 119, 121, 123 are not shown.

Client devices 104, 106, 108, 110 can be any sort of computing devices capable of taking input from a user and communicating over a network (not shown) with server 102 and/or with other client devices. For example, client devices 104, 106, 108, 110 can be mobile devices, desktop computers, laptops, cell phones, personal digital assistants ("PDAs"), servers, embedded computing systems, and so forth. Server 102 can be any of a variety of computing devices capable of receiving information, such as a server, a distributed computing system, a desktop computer, a laptop, a cell phone, a rack-mounted server, and so forth. Server 102 may be a single server or a group of servers that are at a same location or at different locations.

Server 102 can receive information from client devices 104, 106, 108, 110 via input/output ("I/O") interface 200. I/O interface 200 can be any type of interface capable of receiving information over a network, such as an Ethernet interface, a wireless networking interface, a fiber-optic networking interface, a modem, and so forth.

Configuration manager 110 includes applications manager 114, allocation manager 201, re-shard manager 202, and configuration data generator 204, as described in further detail below. Server 102 also includes a processing device 210 and memory 212. A bus system 214, including, for example, a data bus and a motherboard, can be used to establish and to control data communication between the components of server 102.

Processing device 210 may include one or more microprocessors. Generally speaking, processing device 210 may include any appropriate processor and/or logic that is capable of receiving and storing data, and of communicating over a network (not shown). Memory 212 can include a hard drive and a random access memory storage device, such as a dynamic random access memory, or other types of non-transitory machine-readable storage devices. As shown in FIG. 2, memory 212 stores computer programs that are executable by processing device 210. Among these computer programs are applications manager 114, allocation manager 201, re-shard manager 202, and configuration data generator 204.

In the example of FIG. 2, applications manager 114 is configured to retrieve from data repository 208 information specifying applications offered for subscription by server 102. As described above, applications manager 114 is also configured to generate verticals 119, 121, 123, based on subscription information received from tenant 111. Allocation manager 201 is configured to execute a sharding algorithm to determine an allocation of verticals 119, 121, 123 across client devices 104, 106, 108. Generally, the sharding algorithm uses the computing resource information associated with client devices to determine an appropriate client device to implement a particular vertical, including, e.g., a client device that has the necessary resources to implement a particular vertical.

In an example, the sharding algorithm uses the computing resource information associated with client devices 104, 106, 108 to assign verticals to client devices 104, 106, 108. Additionally, a vertical may be associated with various resource requirements, including, e.g., a minimum amount of bandwidth and/or memory required to implement the vertical. In this example, the sharding algorithm matches or otherwise compares the resource requirements of the various verticals to the computing resource information associated with the various client devices to determine which client devices are capable of implementing the various verticals.

In a particular example, vertical 119 consumes a large amount of memory and/or bandwidth, as indicated by the resource requirements associated with vertical 119. Vertical 121 consumes a relatively smaller amount of memory and/or bandwidth, as indicated by the resource requirements associated with vertical 121.

In this example, allocation manager 201 executes the sharding algorithm to compare the resource requirements of verticals 119, 121 to the computing resource information of client devices 104, 106, 108. Based on the comparison, allocation manager 201 assigns vertical 119 to a client device (e.g., one of client devices 104, 106, 108) that has a relatively large amount of memory and bandwidth capabilities, to promote an ability of the client device to implement vertical 119. Allocation manager 201 assigns vertical 121 to a client device (e.g., one of client devices 104, 106, 108) that has a relatively smaller amount of memory and bandwidth capabilities, to promote an ability of the client device to implement vertical 121.

Based on execution of the sharding algorithm, allocation manager 201 generates a service map, including, e.g., information specifying an allocation of verticals among computing resources of a tenant. In particular, allocation manager 201 assigns a vertical to a client device based on the resource requirements of the vertical and the computing resource information of the client device. Information indicative of the assignment is stored in a data structure, including, e.g., the service map. An example of a service map is provided in the below Table 1.

TABLE 1

| | Tenant 111 | | |
|---|---|---|---|
| | Vertical 119 | Vertical 121 | Vertical 123 |
| T1 | Client Device 104 | Client Device 106 | Client Device 108 |
| T2 | Client Device 106 | Client Device 106 | Client Device 108 |

As indicated in the above Table 1, data repository 208 stores information specifying an allocation of verticals 119, 121, 123 across client devices 104, 106, 108 at times T1, T2. Specifically, at T1, vertical 119 is implemented by client device 104. Vertical 121 is implemented by client device 106. Vertical 123 is implemented by client device 108. As described above, at T2, client device 106 implements both verticals 119, 121, and client device 108 continues to implement vertical 123.

Re-shard manager 202 is configured to detect an occurrence of an event, including, e.g., an overloading of a client device, a failure of a client device, an offline status of a client device, a service status of a client device, and so forth. Generally, an event indicates that a client device is in a state in which the client device is not able to implement a vertical and/or the client device has reduced resources with which to implement the vertical. In response to the detection of the occurrence of the event, re-shard manager 202 is also configured to re-execute the sharding algorithm to determine a new allocation of verticals 119, 121, 123 across client devices 104, 106, 108.

In an example, at a first point in time ("T1"), client devices 104, 106, 108 implement verticals 119, 121, 123, as described above with reference to FIG. 1. At a second point in time ("T2"), the resources of client device 104 are consumed by data requests, for example, request message 144 (FIG. 1) from client device 110. The consumption of resources of client device 104 causes the processing speed of client device 104 to slow down, which affects the ability of client device 104 to implement vertical 119. Re-shard manager 202 detects that client device 104 is being overloaded by data requests and determines a new allocation of verticals 119, 121, 123.

In an example, re-shard manager 202 may detect that client device 104 is overloaded by data requests through receipt of an event log sent from client device 104 to server 102. In this example, the event log may include information specifying that the processing speed of client device 104 has slowed down due to an increase in data requests.

Based on detection of the event, re-shard manager 202 executes the sharding algorithm. As previously described herein, the sharding algorithm assigns a vertical to a client device based on the computing resource information of the client device and the resource requirements of the vertical to promote an optimal performance of the vertical on a client device. In particular, re-shard manager 202 compares the computing resource information of available client devices 106, 108, which server 102 may have received in an initialization message, to the resource requirements of vertical 119, to determine whether vertical 119 should be implemented on client device 106 or on client device 108. As described herein, the client devices that are available to implement verticals are referred to as a group of available client devices. In the example of FIG. 2, client device 106 has more resources available to implement vertical 119. Accordingly, at T2, re-shard manager 202 re-allocates vertical 119 to be implemented by client device 106.

Configuration data generator 204 is configured to generate identity response messages 132, 134, 136, which include configuration information associated with a vertical. In the example of FIG. 2, at T1, configuration data generator 204 generates identity response message 132, which includes configuration data associated with vertical 119. Configuration data generator 204 also generates identity response messages 134, 136, which include configuration data associated with verticals 121, 123 respectively. At T1, configuration data generator 204 sends identity response messages 132, 134, 136 to client devices 104, 106, 108. At T2, configuration data generator 204 sends identity response message 132 to client device 106, because vertical 119 has been re-allocated to client device 106. Based on the configuration data included in identity response message 132, client device 106 implements vertical 119.

Applications manager 114 is also configured to generate an address of a client device that is implementing a vertical. In the example of FIG. 1, at T1, applications manager 114 receives request message 140. As described above, request message 140 includes a request for the address of the client device that is implementing vertical 119. In this example, applications manager 114 queries data repository 208 for information specifying an identity of a client device implementing vertical 119. Referring to Table 1 above, data repository 208 may look-up that at time T1, vertical 119 is being implemented by client device 104.

In this example, data repository 208 returns the looked-up information to applications manager 114, and applications manager 114 generates the following address: http://client104/hrbenefits. Applications manager 114 generates response message 142, which includes the address of client device 104, and sends response message 142 to client device 110. In an example, applications manager 114 generates the address by concatenating together a name of client device 104 with a type of application, namely HR benefits, associated with vertical 119.

Figure 3:
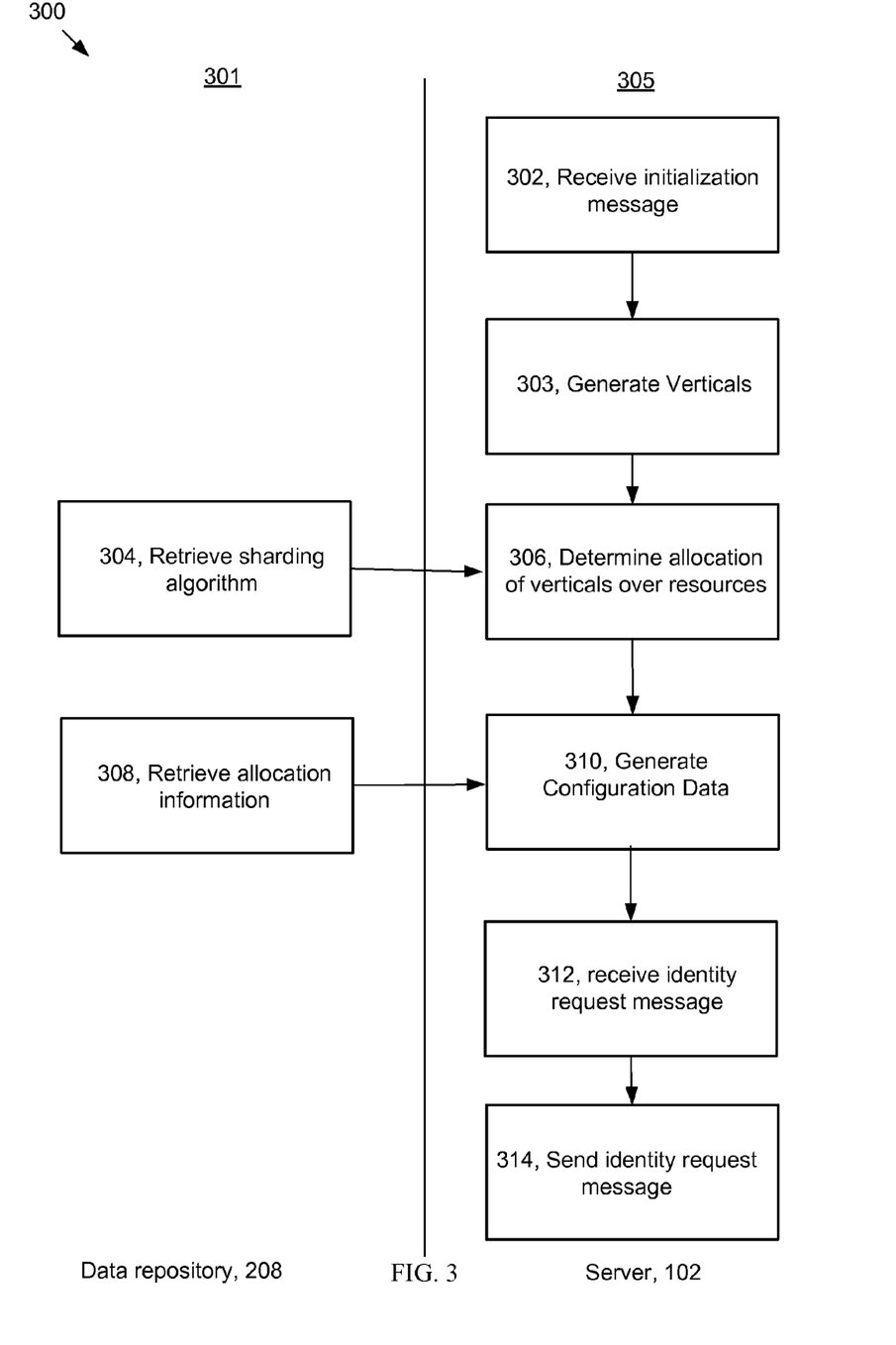
FIG. 3 is a flowchart of a process performed by a configuration manager for allocating verticals among the tenant's resources.

FIG. 3 is a flowchart of process 300 performed by configuration manager 110 for allocating verticals among computing resources of a tenant. In FIG. 3, process 300 is split into a left part 301, which is performed on data repository 208, and a right part 305, which is performed on server 102. Actions shown in FIG. 3 may be assigned differently. For example, in other implementations, actions performed by server 102 may be performed mobile device 104, and vice versa.

In operation, allocation manager 201 receives (302) an initialization message from tenant 111 (FIG. 1). As previously discussed, the initialization message includes subscription information, computing resource information, and tenant information.

In the example of FIG. 3, based on the subscription information included in the initialization message, allocation manager 201 generates (303) verticals 119, 121, 123 for tenant 111. Referring back to FIG. 1, tenant 111 subscribes to applications 118, 120, 122. In this example, allocation manager 201 generates vertical 119, which is an instance of application 118 for tenant 111. Allocation manager 201 also generates vertical 121, which is an instance of application 120 for tenant 111. Allocation manager 201 also generates vertical 123, which is an instance of application 122 for tenant 111.

Allocation manager 201 retrieves (304) a sharding algorithm from data repository 208. Based on an execution of the sharding algorithm, allocation manager 201 determines (306) an allocation of verticals 119, 121, 123 across client devices 104, 106, 108. As described herein, the sharding algorithm generates a service map that maps verticals to client devices, for example, based on the computing resource information of the various client devices. An example of service maps was provided in Table 1. In particular, allocation manager 201 determines the allocation of verticals across client devices by retrieving a service map, for example, from data repository 208, and reading from the service map the particular vertical that has been assigned to a particular client device.

Referring back to FIG. 1 and Table 1, allocation manager 201 allocates vertical 119 to client device 104, vertical 121 to client device 106, and vertical 123 to client device 108. Allocation manager 201 sends (not shown) to data repository 208 allocation information, which is information indicative of the allocation of verticals 119, 121, 123 across client devices 104, 106, 108. Data repository 208 may store the allocation information in a table, e.g., in Table 1.

Configuration data generator 204 retrieves (308) allocation information from data repository 208. Based on the retrieved allocation information, configuration data generator 204 generates (310) configuration data for verticals 119, 121, 123. For example, configuration data may include information specifying an identity for various client devices. Based on the configuration data, configuration data generator 204 may also generate (not shown) identity response messages 132, 134, 136 for verticals 119, 121, 123. Data repository 208 may further be updated with information indicative of identity response messages 132, 134, 136, for example, by associating verticals 119, 121, 123 with corresponding identity response messages 132, 134, 136.

Configuration data generator 204 receives (312) identity request messages 126, 128, 130, for example, from client devices 104, 106, 108. As previously described, an identity request message includes a unique identifier associated with a client device. Based on the unique identifier associated with a client device, configuration data generator 204 determines (not shown) a vertical associated with the client device requesting an identity. Based on the vertical associated with the client device requesting an identity, configuration data generator 204 determines an appropriate identity response message and sends (314) the identity response message to the client device requesting an identity.

In a variation of FIG. 3, re-shard manager 202 may detect an occurrence of an event on client devices 104, 106, 108. Referring back to FIG. 2, at time T1, re-shard manager 202 detects an occurrence of an event on client device 104, as previously described herein. Specifically, as described above, re-shard manager 202 detects that client device 104 is overloaded by data requests. Re-shard manager 202 may detect that client device 104 is overloaded by data requests by receiving from client device 104 information specifying that client device 104 is in an overloaded state, including, e.g., log files, log data, state information, an message indicating that client device 104 is overloaded, and so forth. The following actions may also be performed based on the detection of any or all of the events described herein.

In this variation, re-shard manager 202 generates a re-shard message and sends the re-shard message to client device 104. The re-shard message includes information that notifies client device 104 to prepare for a re-allocation of vertical 119 by completing its pending requests for vertical 119 and rejecting all new requests for vertical 119. The remaining actions 304, 306, 308, 310, 314 shown in FIG. 3 may be executed as described above. For example, based on an execution of actions 304, 306, 308, 310, 314, vertical 119 is implemented by client device 106 at T2, as indicated in FIG. 2 and Table 1.

In another variation of FIG. 3, based on the computing resource information for client devices 104, 106, 108, allocation manager 201 may determine that an optimal allocation of computing resources results when client device 104 and client device 106 swap verticals. In this example, based on the resource requirements of verticals 119, 121, allocation manager 201 determines that vertical 121 consumes fewer resources than vertical 119. Additionally, based on log files received from client device 104, allocation manager 201 determines that client device 104 is being overloaded by data requests and may not be able to implement vertical 119, but may be able to still efficiently implement vertical 121.

In this example, when client device 104 becomes overloaded by data requests, client device 104 generates updated computing resource information including information specifying that client device 104 now has reduced computing resources available for implementation of a vertical. Client device 104 sends the updated computing resource information to server 102.

In this example, allocation manager 201 determines that client device 104 may not be able to optimally implement vertical 119, based on the updated computing resource information, for example, by determining that client device 104 no longer has the resources required to implement vertical 119. Additionally, based on the resource requirements of vertical 121, allocation manager 201 determines that client device 104 has sufficient available resources to implement vertical 121, for example, as indicated by the updated computing resource information for client device 104.

In this variation, vertical 119 is moved to run on client device 106. In particular, based on an execution of actions 304, 306, 308, 310, 314, vertical 119 is implemented by client device 106 at T2, and vertical 121 is implemented by client device 104 at T2.

Figure 4:
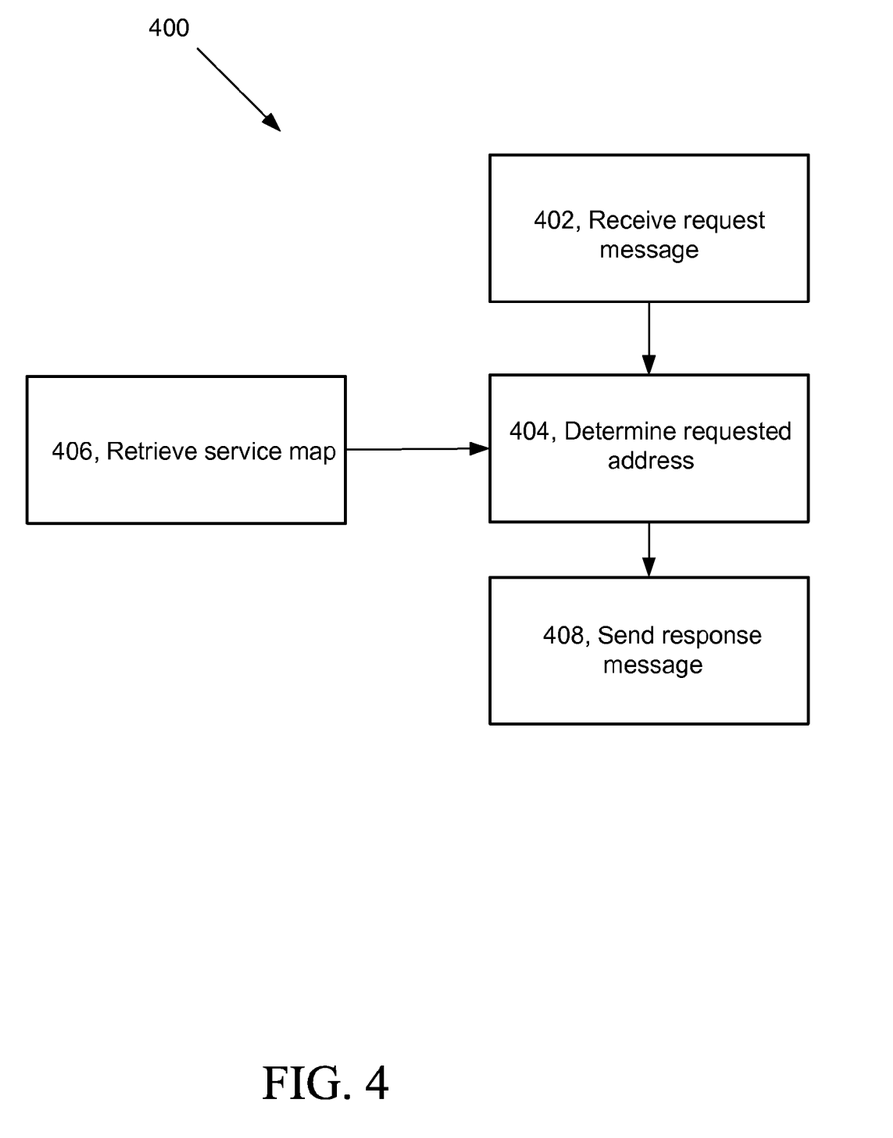
FIG. 4 is a flowchart of a process performed by an applications manager for determining an address of a client device that is implementing a vertical.

FIG. 4 is a flowchart of process 400 performed by applications manager 114 for determining an address of a client device implementing a vertical. In operation, applications manager 114 receives (402) request message 140 (FIG. 1) from client device 110. In an example, request message 140 includes a request for an address of the client device implementing vertical 119 for tenant 111.

In the example of FIG. 4, applications manager 114 retrieves (404) a service map from data repository 208. Referring to Table 1 and as described above, a service map includes a mapping of verticals to client devices. In this example, based on the retrieved service map, applications manager 114 determines (406) an identity of the client device that is implementing the requested vertical. Specifically, applications manager 114 determines that vertical 119 is being implemented on client device 104. As described above, applications manager 114 generates (not shown) an address associated with client device 104 and sends (406) to client device 110 information specifying the address of the client device that is implementing the requested vertical. Specifically, applications manager 114 sends client device 110 response message 142 (FIG. 1).

Using the techniques described herein, configuration manager 110 determines an allocation of verticals across the computing resources of a tenant. Additionally, using the techniques described herein, configuration manager 110 is able to determine an identity of a computing resource that is implementing a particular vertical of a tenant.

Figure 5:
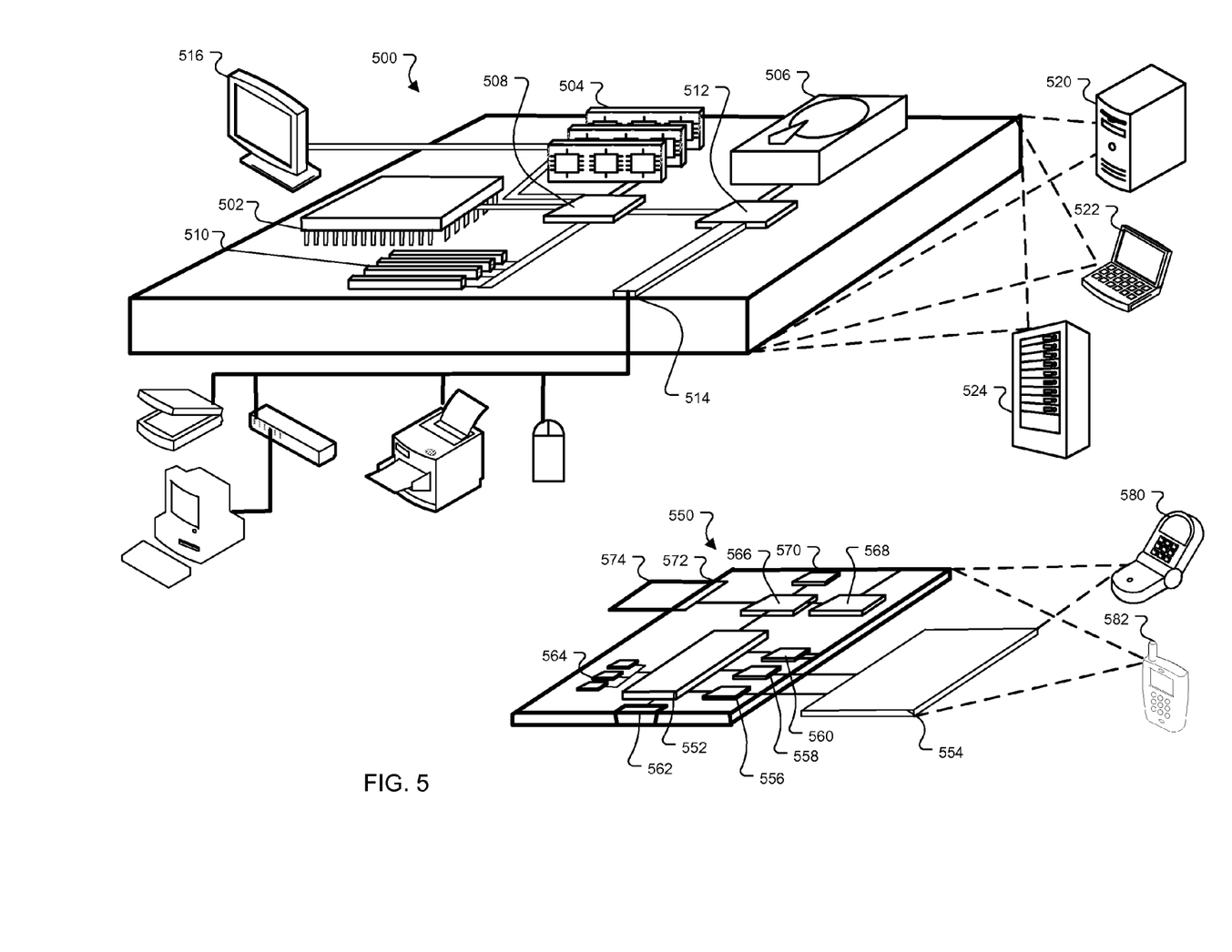
FIG. 5 shows an example of a computer device and a mobile computer device that can be used to implement the techniques described herein.

FIG. 5 shows an example of a computer device 500 and a mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the processes and techniques described herein. For example, in a variation of FIG. 3, at time T3, configuration manager executes process 300 to determine that client device 108 implements verticals 119, 121, 123.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims. Although a few implementations have been described in detail above, other modifications are possible. Moreover, other mechanisms for editing voice may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other embodiments not specifically described herein are also within the scope of the following claims.

What is claimed is:

1. A computer-implemented method comprising:
    retrieving, from a data repository, one or more service resource requirements associated with a plurality of services;
    receiving computing resource information associated with a group of available computing devices;
    comparing the one or more service resource requirements to the computing resource information for the available computing devices;
    matching, based on comparing, the one or more service resource requirements with computing resources of the available computing devices;
    determining, at least partly based on the matching, an allocation of the plurality of services across the group of available computing devices;
    detecting an occurrence of an event in a computing device associated with the group of available computing devices;
    in response to detecting the occurrence of the event in the computing device associated with the group of available computing devices,
        removing the computing device from the group of available computing devices to update the group with remaining available computing devices; and
    in response to removing the computing device from the group of available computing devices;
        re-matching the one or more service resource requirements with computing resources of the remaining available computing devices; and
        re-allocating, at least partly based on re-matching, the previously allocated plurality of services across the updated group of remaining available computing devices.

2. The computer-implemented method of claim 1, wherein the computing device comprises a first computing device, and wherein the method further comprises:
    receiving, from a second computing device, a request for an identity of a third computing device that is hosting a particular service; and
    sending, to the second computing device, information indicative of the identity of the third computing device that is hosting the particular service.

3. The computer-implemented method of claim 1, wherein the computing device comprises a first computing device, and wherein the method further comprises:
    receiving, from a second computing device in the group of available computing devices, a request for configuration data;
    determining a service that is allocated to the second computing device; and
    sending, to the second computing device, configuration data associated with the service that is allocated to the second computing device.

4. The computer-implemented method of claim 3, wherein the configuration data comprises first configuration data, wherein the service comprises a first service, and wherein the method further comprises:
    determining, based on the re-allocating, a second service allocated to the second computing device; and
    sending, to the second computing device, second configuration data associated with the second service allocated to the second computing device.

5. The computer-implemented method of claim 1, wherein the event comprises detection of the computing device being overloaded by data requests.

6. The computer-implemented method of claim 1, further comprising:
    receiving information indicative of a subscription to at least one of the services in the plurality of services.

7. The computer-implemented method of claim 1, wherein determining the allocation of the plurality of services comprises:
    generating a mapping of an assignment of the plurality of services to the group of available computing devices.

8. One or more non-transitory machine-readable hardware storage devices storing instructions that are executable by one or more processing devices to perform operations comprising:
    retrieving, from a data repository, one or more service resource requirements associated with a plurality of services;
    receiving computing resource information associated with a group of available computing devices;
    comparing the one or more service resource requirements to the computing resource information for the available computing devices;
    matching, based on comparing, the one or more service resource requirements with computing resources of the available computing devices;
    determining, at least partly based on the matching, an allocation of the plurality of services across the group of available computing devices;
    detecting an occurrence of an event in a computing device associated with the group of available computing devices;
    in response to detecting the occurrence of the event in the computing device associated with the group of available computing devices,
        removing the computing device from the group of available computing devices to update the group with remaining available computing devices; and
    in response to removing the computing device from the group of available computing devices;

re-matching the one or more service resource requirements with computing resources of the remaining available computing devices; and re-allocating, at least partly based on re-matching the previously allocated plurality of services across the updated group of remaining available computing devices.

9. The one or more non-transitory machine-readable hardware storage devices of claim 8, wherein the computing device comprises a first computing device, and wherein the operations further comprise:

receiving, from a second computing device, a request for an identity of a third computing device that is hosting a particular service; and sending, to the second computing device, information indicative of the identity of the third computing device that is hosting the particular service.

10. The one or more non-transitory machine-readable hardware storage devices of claim 8, wherein the computing device comprises a first computing device, and wherein the operations further comprise:

receiving, from a second computing device in the group of available computing devices, a request for configuration data;

determining a service that is allocated to the second computing device; and sending, to the computing device, configuration data associated with the service that is allocated to the second computing device.

11. The one or more non-transitory machine-readable hardware storage devices of claim 10, wherein the configuration data comprises first configuration data, wherein the service comprises a first service, and wherein the operations further comprise:

determining, based on the re-allocating, a second service allocated to the second computing device; and sending, to the second computing device, second configuration data associated with the second service allocated to the second computing device.

12. The one or more non-transitory machine-readable hardware storage devices of claim 8, wherein the event comprises detection of the computing device being overloaded by data requests.

13. The one or more non-transitory machine-readable hardware storage devices of claim 8, wherein the operations further comprise:

receiving information indicative of a subscription to at least one of the services in the plurality of services.

14. The one or more non-transitory machine-readable hardware storage devices of claim 8, wherein the operations further comprise:

generating a mapping of an assignment of the plurality of services to the group of available computing devices.

15. An electronic system comprising:

one or more processing devices; and one or more machine-readable hardware storage devices storing instructions that are executable by the one or more processing devices to perform operations comprising:

retrieving, from a data repository, one or more service resource requirements associated with a plurality of services;

receiving computing resource information associated with a group of available computing devices;

comparing the one or more service resource requirements to the computing resource information for the available computing devices;

matching, based on comparing, the one or more service resource requirements with computing resources of the available computing devices;

determining, at least partly based on the matching, an allocation of the plurality of services across the group of available computing devices;

detecting an occurrence of an event in a computing device associated with the group of available computing devices;

in response to detecting the occurrence of the event in the computing device associated with the group of available computing devices, removing the computing device from the group of available computing devices to update the group with remaining available computing devices; and in response to removing the computing device from the group of available computing devices;

re-matching the one or more service resource requirements with computing resources of the remaining available computing devices; and re-allocating, at least partly based on re-matching the previously allocated plurality of services across the updated group of remaining available computing devices.

16. The electronic system of claim 15, wherein the computing device comprises a first computing device, and wherein the operations further comprise:

receiving, from a second computing device, a request for an identity of a third computing device that is hosting a particular service; and sending, to the second computing device, information indicative of the identity of the third computing device that is hosting the particular service.

17. The electronic system of claim 15, wherein the computing device comprises a first computing device, and wherein the operations further comprise:

receiving, from a second computing device in the group of available computing devices, a request for configuration data;

determining a service that is allocated to the second computing device; and sending, to the second computing device, configuration data associated with the service that is allocated to the second computing device.

18. The electronic system of claim 17, wherein the configuration data comprises first configuration data, wherein the service comprises a first service, and wherein the operations further comprise:

determining, based on the re-allocating, a second service allocated to the second computing device; and sending, to the second computing device, second configuration data associated with the second service allocated to the second computing device.

19. The electronic system of claim 15, wherein the operations further comprise:

generating a mapping of an assignment of the plurality of services to the group of available computing devices.

20. An electronic system comprising:

a module for:

retrieving, from a data repository, one or more service resource requirements associated with a plurality of services;

receiving computing resource information associated with a group of available computing devices;

comparing the one or more service resource requirements to the computing resource information for the available computing devices;

matching, based on comparing, the one or more service resource requirements with computing resources of the available computing devices;
determining, at least partly based on the matching, an allocation of the plurality of services across the group of available computing devices;
detecting an occurrence of an event in a computing device associated with the group of available computing devices;
in response to detecting the occurrence of the event in the computing device associated with the group of available computing devices,
   removing the computing device from the group of available computing devices to update the group with remaining available computing devices; and
in response to removing the computing device from the group of available computing devices;
   re-matching the one or more service resource requirements with computing resources of the remaining available computing devices; and
   re allocating, at least partly based on re-matching the previously allocated plurality of services across the updated group of remaining available computing devices.

\* \* \* \* \*